United States Patent
Bhagwan et al.

(10) Patent No.: US 10,380,174 B2
(45) Date of Patent: *Aug. 13, 2019

(54) TEMPLATE-BASED RECOGNITION OF FOOD PRODUCT INFORMATION

(71) Applicant: International Business Machines Corporation, Armonk, NY (US)

(72) Inventors: Varun Bhagwan, San Jose, CA (US); Justin Ormont, Beaver Dam, WI (US); Heather Underwood, Boulder, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 490 days.

This patent is subject to a terminal disclaimer.

(21) Appl. No.: 15/017,344

(22) Filed: Feb. 5, 2016

(65) Prior Publication Data

US 2016/0154823 A1  Jun. 2, 2016

Related U.S. Application Data

(63) Continuation of application No. 12/828,139, filed on Jun. 30, 2010, now Pat. No. 9,292,565.

(51) Int. Cl.
*G06F 16/58* (2019.01)
*G06F 16/583* (2019.01)
*G06F 16/242* (2019.01)
*G06F 16/955* (2019.01)
*G06K 9/18* (2006.01)
*G06K 9/62* (2006.01)

(52) U.S. Cl.
CPC ........ *G06F 16/5838* (2019.01); *G06F 16/242* (2019.01); *G06F 16/5866* (2019.01); *G06F 16/9554* (2019.01); *G06K 9/18* (2013.01); *G06K 9/6201* (2013.01)

(58) Field of Classification Search
None
See application file for complete search history.

(56) References Cited

U.S. PATENT DOCUMENTS

| | | | |
|---|---|---|---|
| 5,134,669 A | 7/1992 | Keogh et al. | |
| 5,668,897 A * | 9/1997 | Stolfo | G06F 17/30247 382/283 |
| 6,535,883 B1 * | 3/2003 | Lee | G06F 9/44 707/694 |
| 6,796,507 B2 | 9/2004 | Bean et al. | |
| 6,974,078 B1 | 12/2005 | Simon | |

(Continued)

OTHER PUBLICATIONS

Ellen Badinelli, "ScanAvert: Detection and Alarm against Ingredient Harm", Source: 2006 3rd IEEE Consumer Communications and Networking Conference, CCNC 2006, v 2, p. 1286-1287, 2006, 2006 3rd IEEE Consumer Communications and Networking Conference, ISBN-10: 1424400856, Publisher: IEEE.

*Primary Examiner* — Jau Shya Meng
(74) *Attorney, Agent, or Firm* — Fabian VanCott; Steven L. Nichols

(57) ABSTRACT

A method for template based recognition of food product information includes capturing an image of food product packaging and extracting an attribute from the image. The attribute is used to find a matching template in a template database. The matching template is then used to extract food product information from the image.

20 Claims, 10 Drawing Sheets

(56) References Cited

U.S. PATENT DOCUMENTS

| | | | |
|---|---|---|---|
| 6,980,999 B1* | 12/2005 | Grana | G06Q 30/02 |
| | | | 600/300 |
| 7,100,167 B2* | 8/2006 | Novik | G06F 9/542 |
| | | | 719/318 |
| 7,213,743 B2 | 5/2007 | Carlson et al. | |
| 7,831,942 B1 | 11/2010 | Gennari et al. | |
| 7,933,965 B2 | 4/2011 | Bonar et al. | |
| 7,958,081 B2 | 6/2011 | Fitzpatrick et al. | |
| 8,131,721 B2 | 3/2012 | Kataoka et al. | |
| 2002/0087574 A1 | 7/2002 | Walsh et al. | |
| 2002/0125313 A1 | 9/2002 | Broff | |
| 2004/0133598 A1* | 7/2004 | Dobrowski | G06F 17/30569 |
| 2004/0176114 A1 | 9/2004 | Northcutt | |
| 2005/0205671 A1* | 9/2005 | Gelsomini | G06K 9/2009 |
| | | | 235/384 |
| 2006/0026268 A1* | 2/2006 | Sanda | G06F 9/5011 |
| | | | 709/221 |
| 2006/0098899 A1* | 5/2006 | King | G06F 17/30011 |
| | | | 382/305 |
| 2006/0227351 A1* | 10/2006 | Fabel | G06F 3/1205 |
| | | | 358/1.12 |
| 2007/0050413 A1* | 3/2007 | Kominek | G06F 17/30899 |
| 2007/0088566 A1 | 4/2007 | Berkelhamer et al. | |
| 2007/0143217 A1 | 6/2007 | Starr | |
| 2007/0237427 A1* | 10/2007 | Patel | G06K 9/00442 |
| | | | 382/305 |
| 2008/0189099 A1* | 8/2008 | Friedman | G06F 17/30766 |
| | | | 704/8 |
| 2008/0263011 A1 | 10/2008 | Badinelli | |
| 2008/0279481 A1 | 11/2008 | Ando | |
| 2009/0048820 A1 | 2/2009 | Buccella | |
| 2009/0158322 A1 | 6/2009 | Cope et al. | |
| 2009/0172513 A1 | 7/2009 | Anderson et al. | |
| 2009/0210325 A1 | 8/2009 | Borom | |
| 2011/0252160 A1 | 10/2011 | Wu et al. | |

\* cited by examiner

TEMPLATE-BASED RECOGNITION OF FOOD PRODUCT INFORMATION

BACKGROUND

Food packaging often contains nutritional and ingredient information. For a variety of reasons, consumers may want to have an accurate understanding of the nutritional and ingredient information of food products they consume. For example, the consumer may have an allergy to a food product or may be following a structured diet for health, religious or other reasons. However, the information contained on the food packaging is often not as accessible or useful to a consumer as it could be. For example, the units presented on the label may not be those which are customarily used by the consumer and therefore convey little useful or usable information to the consumer. Sight challenged individuals may be unable to read the small type on the packaging. The ingredient lists often contain scientific names that most consumers are unfamiliar with. The language used on the packaging may not be the native language of the consumer. For these and other reasons, food packaging may not meet the actual needs of consumers in making purchasing and consumption decisions.

BRIEF SUMMARY

A method for template based recognition of food product information includes capturing an image of food product packaging and extracting one or more attributes from the image. The attribute(s) is used to find a matching template in a template database. The matching template is then used to extract food product information from the image.

A system includes a mobile device with a camera, a template database which includes product nutritional data and ingredient list templates, and a template matching module for matching an image of a food product taken with the camera with templates in the template database. An analytics engine extracts information from the image according to the template. An optional personal filter manipulates the extracted information according to user preferences to produce personalized data which is presented to the user of the mobile device.

A computer program product for template based recognition of food product information includes computer readable program code configured to capture an image of food product packaging, extract at least one attribute from the image, and use the attribute to identify a matching template in a template database. The computer readable program code then uses the matching template to extract food product information from the image.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
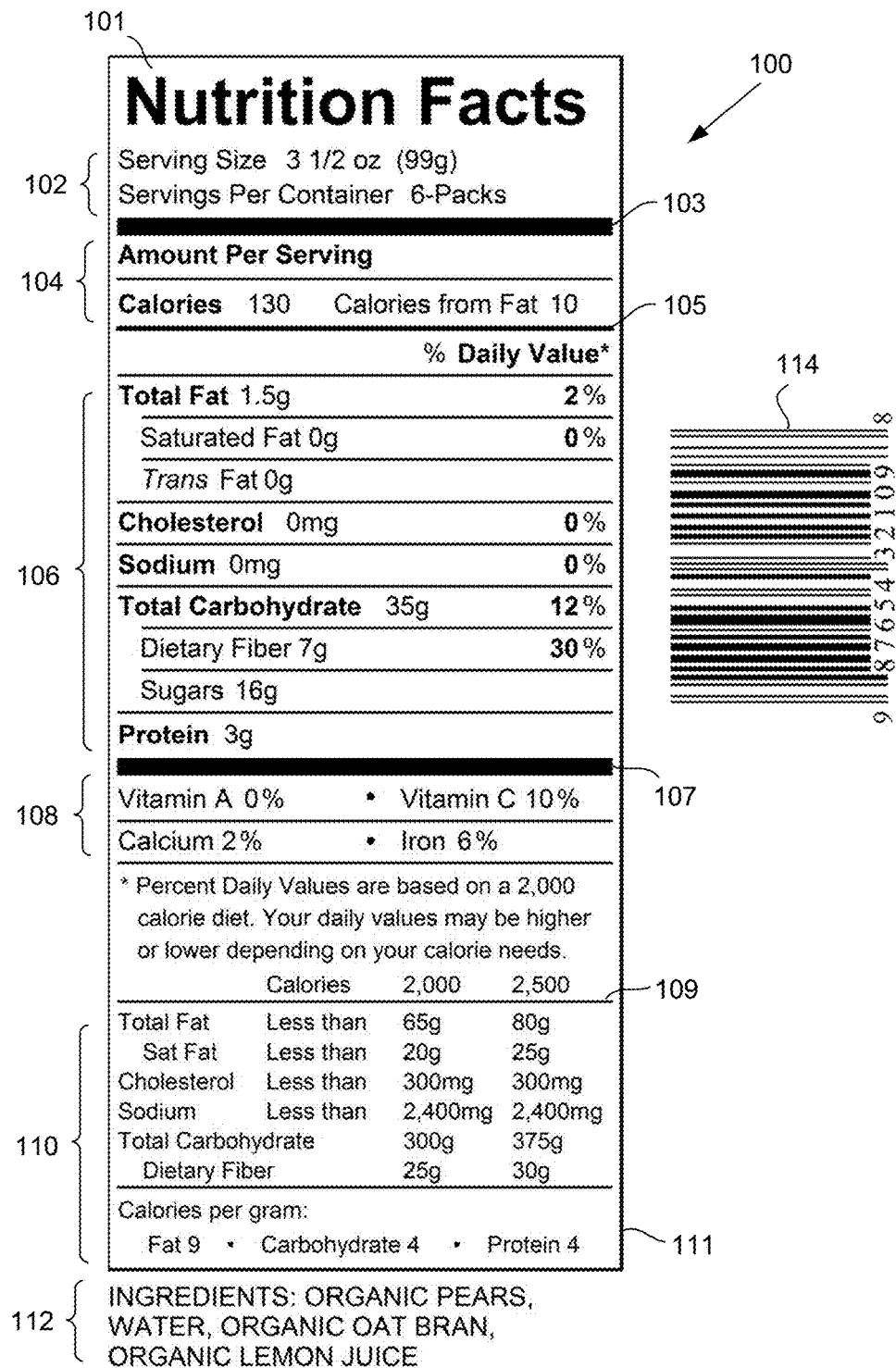
FIG. 1 is an illustrative example of a food product label, according to one embodiment of principles described herein.

The present specification discloses systems and methods for template based recognition of food product information. As discussed above, food packaging often contains nutritional and ingredient information. In the United States, requirements control some aspects of this nutritional and ingredient information. Although the Food and Drug Administration (FDA) and other governmental agencies have regulatory standards for nutrition fact tables and ingredient lists, there is no single standard and many manufacturers diverge from these standards to create their own label formats. Label formats vary, depending on the type of food product, package size, batch size, etc. Also, the units for nutritional information do not conform to a single standard. Many stores carry imported foods that use a variety of formats and measurement units. Additionally, the language used on the label may be foreign to the consumer.

For a variety of reasons, consumers may want to have an accurate understanding of the food products they consume. For example, the consumer may have an allergy to a particular food or may be following a structured diet for health, religious or other reasons. However, obtaining the desired information from a product package can be challenging. For example, reading information contained on small print and lengthy lists on product labels can be difficult. Also, packaging that is glossy, rounded, folded, etc., can create space limitations, further increasing the reading difficulty for the interested consumer. Even if consumers are able to read the printed label, many ingredient lists contain unfamiliar language, such as scientific names for ingredients, that most consumers are unfamiliar with, making it difficult to be truly confident that the food products adhere to a consumer's food preferences. At the extreme, severe allergen or dosage information may be overlooked resulting in hospitalization or even fatality.

A system and method for template based recognition of food product information is described below. According to one illustrative embodiment, a mobile device is used to scan or capture an image of food packaging. This image of the food packaging may include various types of information or attributes which allow it to be matched to a template. A template for a food product label may contain, for example, a table structure, nutritional facts, an ingredient list format, and a particular font. A template that matches an image can be used to more accurately and quickly extract the desired nutritional or other information. This extracted information can then be transformed and/or combined with other data to provide the user with personalized, relevant, and timely information.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the United States and other countries, oversight organizations promulgate labeling requirements for foods. Food labeling is required for most prepared foods, such as breads, cereals, canned and frozen foods, snacks, desserts, drinks, etc. FIG. 1 shows one example of an illustrative nutritional facts panel (101) which conforms to the Food and Drug Administration (FDA) labeling requirements. The FDA provides a number of guidelines but allows the food manufacturers to design and print the food product information in a variety of formats, sizes, and locations.

The food product information (100) includes a nutritional facts panel (101), an ingredient list (112) and a barcode (114). The nutritional facts panel (101) includes serving information (102), calories (104), nutrient list (106), vitamin/mineral amounts (108), dietary footnote (110), and ingredients list (112). The serving information (102) can include such information as the size of an individual serving from the food product and the total number of individual servings contained in the package. The calories (104), nutrient list (106), and vitamin/mineral listing (108), provide a measure of the energy and nutrients provided by an individual serving. The ingredient list (112) provides a listing of components which make up the food product.

In addition to alpha numeric characters, the nutritional fact panel (101) includes a number of graphical elements. Specifically, the nutritional fact panel (101) comprises a box (111) which surrounds the panel and a number of horizontal rules across the box. A seven point rule (103) separates the title and serving information from the "amount per serving" section. A three point rule (105) separates the calorie information from the nutrient listing. Another seven point rule (107) separates the "amount per serving" section from the vitamin and mineral section. A number of one point rules (109) separate the individual entries of the box (111). These graphical attributes can be used to identify the format of a given nutrient fact panel.

Although most prepared foods include a listing which is similar to that shown in FIG. 1, these product listings may not provide the information that the consumer needs or in a format which can be readily understood and applied by the consumer. Some consumers, such as elderly diabetics, may need to read and understand the contents of the label to adjust their medications according to what they eat. However, they may be physically unable to read small type of the label. In another example, the consumer may speak Spanish while the label is in English. Additionally, the consumer may be accustomed to different units than are presented on the product listing. For example, the consumer may be using the product in a recipe which uses cups rather than grams or ounces as a unit of measure. Further, a consumer may have an allergy and is scanning the ingredient list for the allergen. Although the product contains the allergen, the ingredient list does not present this information in the way that is expected by the consumer. These and other issues can be resolved by implementing a system for template based retrieval of nutrient and ingredient information from the food items.

Figure 2:
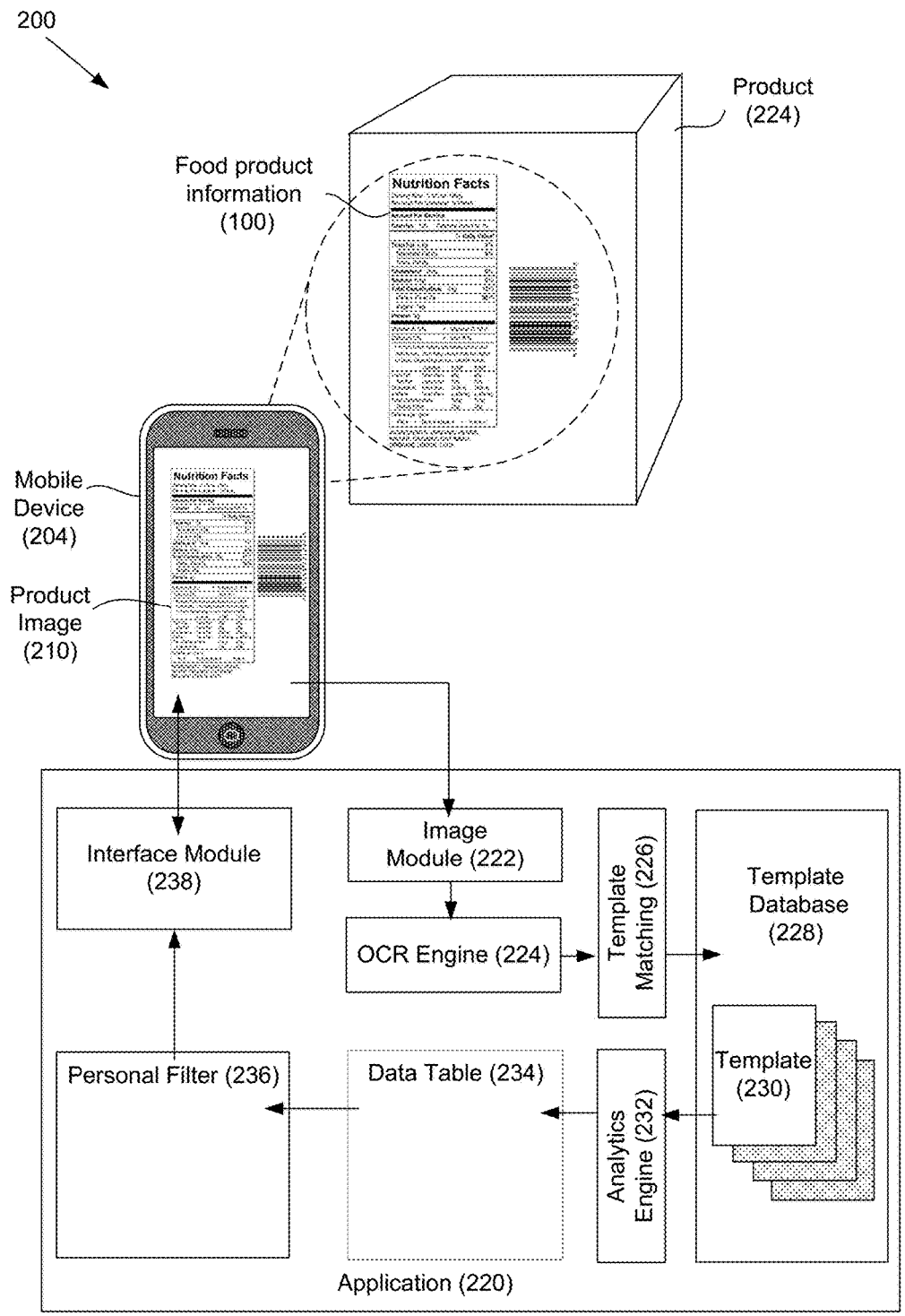
FIG. 2 is a diagram of an illustrative system for template based recognition of food product information, according to one embodiment of principles described herein.

FIG. 2 shows a system (200) for template based recognition of nutrient and ingredient information from food items. In this example, the system (200) includes a mobile device (204) which uses an integrated camera to take a digital photograph of the product (224). Although a mobile phone is used as an example of a mobile device (204) a number of other devices could also be used. The photographed area includes portions of the product packaging printed with the food product information (100). The system (200) analyzes the product image (210) to extract the product information and present relevant information to the consumer. However, recognizing and assigning meaning to this digital image data can be challenging. As discussed above, the food product information may be presented in a variety of formats, languages, and typesets. Additionally, the image of the food product packaging may be taken under less than ideal light conditions, may be skewed, out of focus, or blurred. However, if a template of the food product information is available, the information contained in the template can assist the system in correctly interpreting the food packaging.

The system (200) for template based recognition of nutrient and ingredient information includes an application (220). Typically, the application (220) is resident on, and operated by, the mobile device (204). These mobile devices may come preprogrammed with the application (220) or the application (220) may be downloaded by a user. However, in some circumstances, it may be advantageous for the application (220) to be operated remotely from the mobile device (204). For example, if the mobile device (204) has limited processor or storage capacity, it may be more effective for the mobile device to capture an image of the product information and send the image to a remote server for analysis. The remote server uses the application (220) to recognize food product data from the image and perform the desired manipulation of the data. This data is then returned to the mobile device (204) for display to the user.

The application (220) includes an image capture module (222), optical character recognition (OCR) engine (224) and a template matching module (226). The image capture module (222) interfaces with the camera hardware/software to obtain an image for analysis. By way of example and not limitation, the image capture module (222) may include a framegrabber, noise reduction filters, spatial filters, image analysis algorithms, deskewing, color balancing, contrast enhancement, edge detection, cropping, and other functionality.

The image data is then passed to the OCR engine (224) which extracts various attributes from the image. As discussed above, the OCR engine (224) may extract text, numbers, and symbols from the text. According to one embodiment, the OCR engine (224) may also recognize attribute placement, white space, separator bars, text groups, columns, color differences, and other features of the product packaging. For example, the OCR engine (224) may recognize black on white text as being more likely to be part of a nutrient facts box, the rules which separate various sections of the nutrient facts box, the outline of the nutrient facts box, the group of terms which make up the ingredients, etc. If the image capture module (222) and OCR engine (224) are unable to recognize a significant amount of data from the image, the image data may be discarded and the image capture module (222) may capture a different image. In some embodiments, prompts may be provided to the user who is taking the product images (210). For example, the application may request that the user hold the mobile device so that the product data is as large as possible on the screen while remaining in focus. The user then takes a second picture for analysis.

A template matching module (226) accepts the data generated by the OCR engine (224) and attempts to find a matching template (230) in a template database (228). The template matching module (226) may use a variety of factors to determine which template to use. For example, the template matching module (226) may simply use the image produced by the image capture module (222) to calculate a vector distance between each of the templates (230). The template (230) which has the smallest vector distance is then selected as a match. Additionally or alternatively, the template matching module (226) may use the features, locations, and text to recognize which template is the closest to the product image.

After selecting a matching template (230), the OCR output and matching template are sent to the analytics engine (232). The analytics engine (232) uses the template as a guide for assigning recognized features and text to a data table (234). The data table (234) can be a relational database which assigns relevance and context to the data. For example, if the OCR output includes the number "12" at a given location, the analytics engine (232) may use the template to determine that the number "12" is a measurement in grams of the protein content of a serving of the food product. The analytics engine (232) then assigns the number "12" to the table entry for protein. In some embodiments, the analytics engine (232) may use contextual clues to fill in missing or incorrectly recognized information. For example, when the ingredient list is in very small type, there is an increased chance that the OCR engine may not be able to recognize one or more characters of an ingredient. The analytics engine (232) may be able to correctly identify the ingredient from the correctly identified characters, the type of food product, and a list of common ingredients for the food product type. The analytics engine (232) may also perform other operations to produce a more complete data table (234).

The data table (234) is accessed by a personal filter (236). The personal filter (236) uses information in the data table (234) to generate personalized displays and user interaction. The personal filter (236) may perform a variety of functions, including language translation, definition of terms, unit conversion, conversion of scientific terms into common terms, allergen analysis, increase the accessibility of the data, apply personalized calculations to the data, provide cumulative results or histories, communicate reminders to the user, and other functions.

The interface module (238) generates output which is sent to the screen and/or audio devices present on the mobile device (204). The interface module (238) may include displayed information which was gathered from a variety of sources, including the personal filter (236). For example, the interface module (238) may display the name of a product, picture of the product downloaded from the internet using barcode information, and the ingredient list from the product packaging. The interface module (238) may also generate a number of interactive buttons or links which can be selected by the user for additional information or functionality.

The application presented in FIG. 2 is only one illustrative embodiment of an application which could be used for template based recognition of food product information. The application may have a variety of different configurations. For example, the modules shown in FIG. 2 may be reordered or combined. In one embodiment, the OCR engine (224) functionality may be applied after a template match has been identified. In another embodiment the template matching module (226) may be combined with the OCR engine (224). This combined module may iteratively attempt to recognize attributes of the image and then attempt to make a match with a template. The template which is selected is then applied to assist in the OCR of the image data. The process is repeated until a satisfactory template match is made and the data is correctly decoded. A variety of configurations could also be used.

Figure 3:
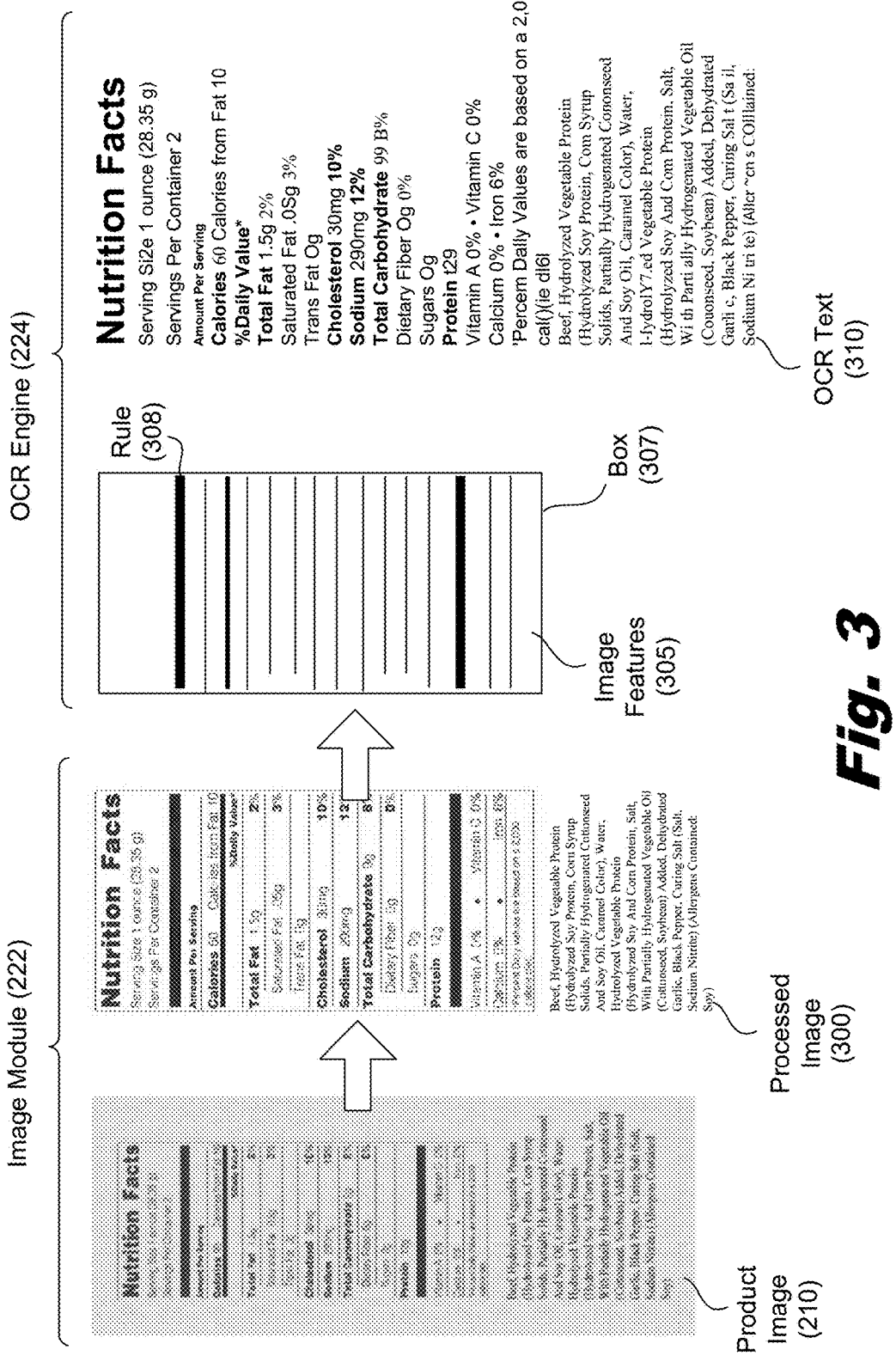
FIG. 3 is a diagram of illustrative steps in a method for template based recognition of food product information, according to one embodiment of principles described herein.
Figure 4:
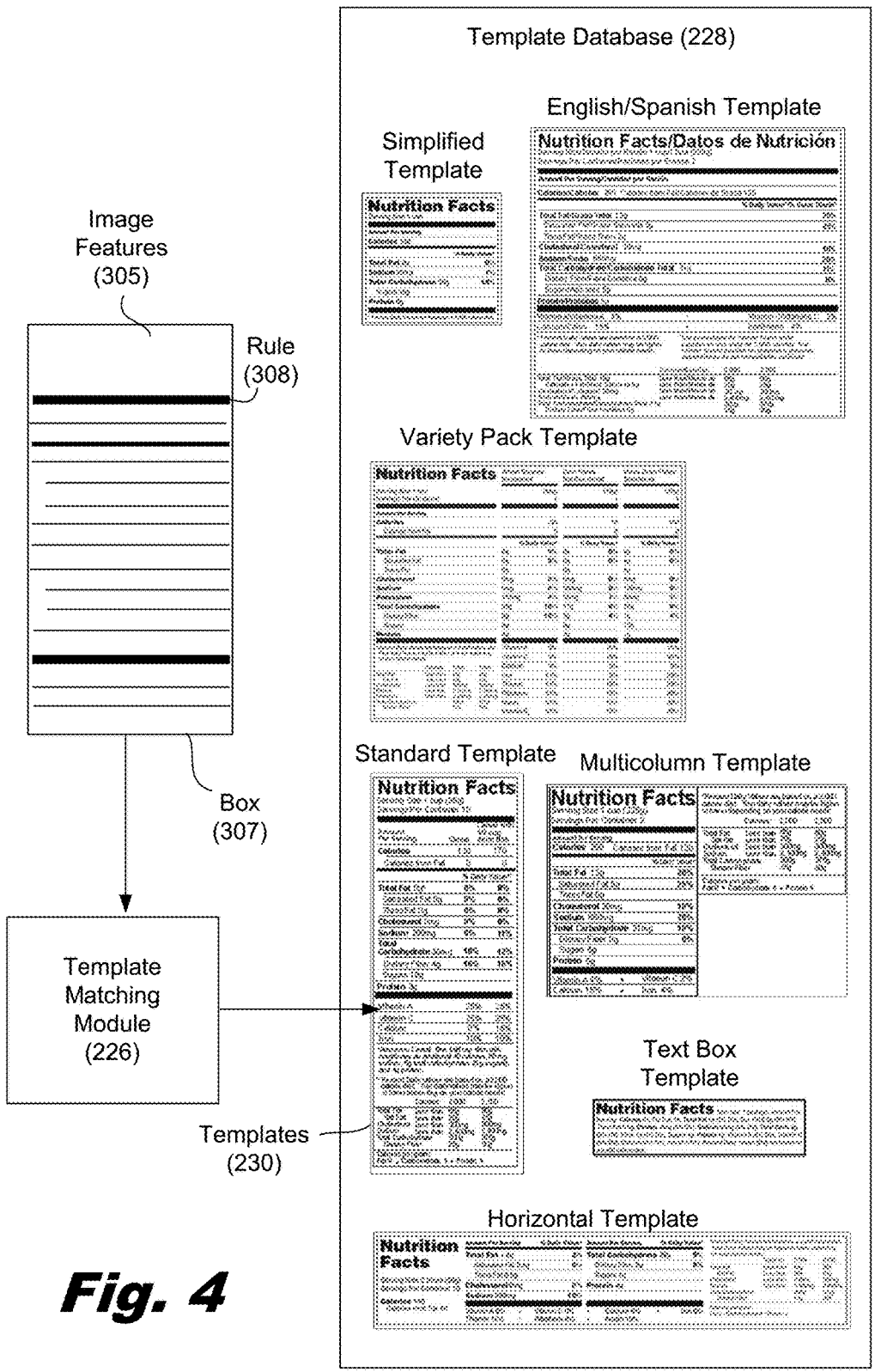
FIG. 4 is a diagram of an illustrative template matching module and template database, according to one embodiment of principles described herein.
Figure 5:
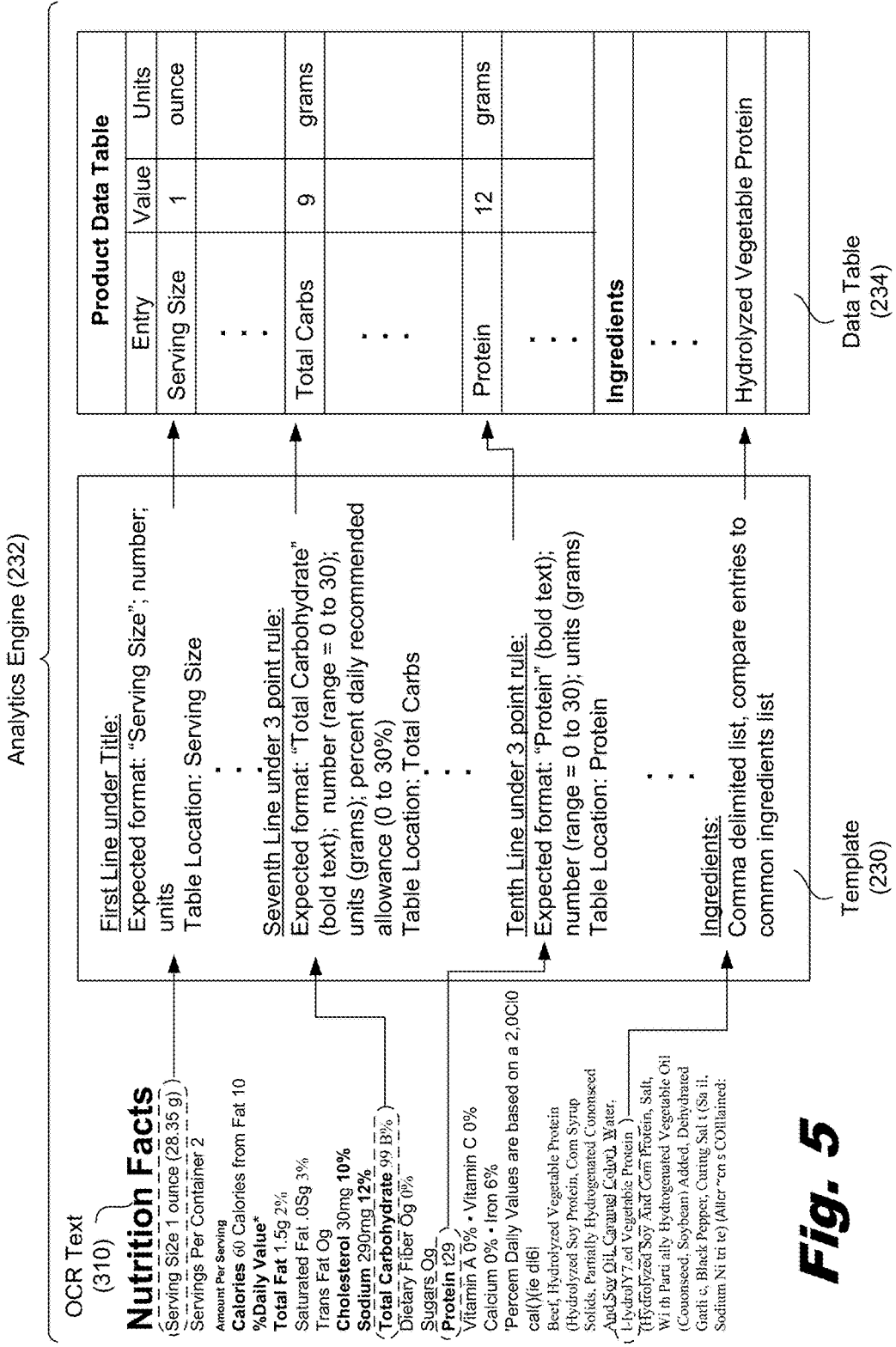
FIG. 5 is a diagram of illustrative steps performed by an analytics engine, according to one embodiment of principles described herein.

Specific examples of the functions provided by the application are provided in FIGS. 3-5. FIG. 3 shows one illustrative example of processing provided by the image module (222) and the OCR engine (224). In this example, the image module (222) captures a product image (210). The product image (222) may have been taken by the user in less than ideal lighting and camera angles. The image module (222) may take a number of actions to correct the image problems, including deskewing, adjusting proportions, and improving contrast. These actions produce the processed image (300). The processed image (300) has better white/black contrast and proportions than the original product image (210). These characteristics may provide improved character recognition.

The OCR engine (224) accepts the processed image (300) and extracts image features (305) and OCR text (310). According to one embodiment, the image features (305) may include the box (307) surrounding the nutrition facts and the horizontal rules (308) within the box (307). The OCR text (310) represents a best effort to optically recognize the text, symbols and numbers in the processed image (300). However, some errors are evident in the OCR text. As discussed above, a number of these errors may be corrected by further processing and using additional information provided by a template.

FIG. 4 shows one illustrative method for selecting a matching template from a template database (228). A template database (228) is a collection of various templates as defined on the FDA and USDA websites, as well as supplemental templates that have been found in products in the marketplace. Each of these templates in the database is associated with a set of attributes specific to the template. In order to identify a matching template, the application uses one or more attributes which have been extracted from the processed image and compares them with templates (230) in the template database (228). An attribute could be any relevant information contained in the image, including a table, format, language, category, barcode, product title, or other information. The template which is most similar to the selected attributes of the processed image is then selected as the matching template.

In this example, the template matching module (226) uses the image features (305) to select a matching template. The template matching module (226) could use the aspect ratio of the box (307), the size of the box (307), the location and number of the rules (308), and other factors. Additionally or alternatively, the template matching module (226) could use attributes from the original image (210, FIG. 3), the processed image (300, FIG. 3), and/or the OCR text (310, FIG. 3).

The template database (228) may include a plurality of the templates (230). The templates (230) may capture formats, features, and characteristics of product information. In the example shown in FIG. 4, the templates are illustrated as images. However, the templates may capture the attributes in a variety of ways. For example, the templates may include text; text formats; designations of column and lines; the location of numbers or columns of numbers; expected text strings, values or value ranges; interrelationships between values or text; and other information. In some embodiments, the templates may be detailed enough to include numeric values and specific nutritional facts.

As discussed above, there are general guidelines for the nutritional facts box and ingredient lists, but the manufacturers are free to adapt the actual labels to suit product, packaging, and other needs. As a result, there may be a number of new or repackaged products which have new information formats or packaging configurations. Consequently, the template database (228) may not have a matching template for a product. When no template match is found by the template matching module (226), a number of actions may be taken. A warning may be displayed to the user that the product is new or that no template for the product is available. Additionally, the application may send the product image, processed image, and/or derived data to a centralized database. This data may be aggregated with other data received by other users. In this way the public may help capture and systemize large amounts of data. This crowdsourcing approach can be very effective in detecting new formats/products and collecting data for further analysis. The aggregated data can be analyzed to produce new templates which are added to the template database. In some embodiments, creation of new templates using crowdsourcing occurs when a substantial number of users have not been able to access a template from the template database for a given product label. Such labels go through a review process and subsequently new templates are generated for these products and added to the template database.

According to one illustrative embodiment, a template crawler may be used to extract information available on the internet. For example, the template crawler could parse government websites (FDA, USDA, etc.) that provide general standards for labels, search social networks, oversight agencies, retailers, and product reviews for information that can be used to develop new templates or improve existing templates. In other embodiments, the data extracted by the mobile device from the product image could form the basis of a new template. This template could be uploaded to the template database and be accessible by other users.

In one example, the template database is a centralized database which is accessed as needed by the mobile devices. In other embodiments, copies of the template database reside on each of the mobile devices. These local copies of the template database can be updated by pushing out updates to the mobile devices, upon request by the mobile device, or through other means.

FIG. 5 is an illustrative example of the actions taken by the analytics engine (232). In this example, the analytics engine (232) uses the template (230) which was matched to the product by the template matching module (226) to identify information in the OCR text (310) and place it in the data table (234). The analytics engine (232) may also identify errors in the OCR data and correct them.

In FIG. 5, the OCR text (310) is to the left of the page, with the template (230) in the center and the data table (234) on the right. Portions of the OCR text are circled with a dashed line and sent through the process performed by the analytics engine (232). The first circled portion of OCR data reads "Serving Si2e 1 ounce (28.35 g)." The OCR engine (224) has incorrectly identified the "z" in the word "Size" as a "2". The analytics engine (232) reads the template (230) which states that for the first line under the title, the expected format is: "Serving Size," then a numeric value, followed by the units of the numeric value. Using this information the analytics engine correctly identifies and corrects the misspelled text string, the numeric value of "1," and the units of "ounces". The analytics engine (232) may cross check the value in grams to confirm that "1 ounce" is its equivalent. The analytics engine (232) then enters the data in the product data table.

The second circled portion of the OCR data reads "Total Carbohydrate 99 B %". The OCR engine (224) has incorrectly identified the "9g" as "99" and "8%" as "B %". The analytics engine reads the template (230) which states that for the seventh line under the title, the expected format is: "Total Carbohydrate," then a numeric value that has a range from 0 to 30, followed by the units of the numeric value with units in grams. This is followed by the daily recommended allowance with a range from 0-30 and units in percent. Analytics engine (232) confirms that the text is correct, but determines that the expected number, units, and percentage of daily recommended allowance are not present. The analytics engine (232) parses the unknown alphanumeric text and consults a list of commonly misinterpreted symbols. The analytics engine determines that "g" is commonly misinterpreted as "9" and that "8" is commonly misinterpreted as "B". After making these substitutions, the analytics engine verifies the number, units and percent daily recommended allowance are correct. For example, because the "9g" of protein and "8%" recommended daily allowance are related by an equation, the analytics engine (232) could use this relationship to verify that the two corrected entries are equivalent. The analytics engine (232) then enters the data in the table under the entry "Total Carbs." The analytics engine (232) performs a similar operation on the third circled portion of the OCR data and enters the corrected value and units in the appropriate location in the table (234).

The fourth circled portion of the OCR data reads "1-IydrolY7.ed Vegetable Protein". The OCR engine (224) has incorrectly identified the "Hydrolyzed" as "1-IydrolY7.ed." The analytics engine reads the template (230) which states that for the ingredient list, entries should be compared to a common ingredients list. The analytics engine (2320 may check the common ingredients list and/or use contextual information to determine that "hydrolyzed" is a common modifier for "vegetable protein." The analytics engine (232) may also consult the list of commonly misinterpreted symbols. The analytics engine (232) determines that the text "1-IydrolY7.ed" should read "Hydrolyzed" and inserts the corrected ingredient name in the table.

After making a first attempt to correct and categorize the OCR data, the analytics engine (232) may check the integrity of the data entered in the data table (234). For example, these checks may include determining that the total grams of fat, carbohydrates, and protein are less than or equal to the total mass of the serving. The analytics engine (232) could also check to determine if the ratios between the fat, carbohydrates, and protein are consistent with values expected from the first three listed ingredients. According to one embodiment, the analytics engine (232) may access outside information using a product barcode to verify the information. These and other techniques could be used by the analytics engine (232) to verify the data in the data table (234).

This method of correcting and categorizing the food product information described above is only one illustrative example. The steps described above could be combined, eliminated, or additional steps could be added.

FIGS. 6-9 are illustrative examples of the template-based recognition of food product information and the generation of user specific outputs from the food product information. Examples of personalization of the data may include calculations, localizations, and translations which are performed to give consumers relevant information in a preferred format. For example, amounts and percentages can be translated by the application according to user defined preferences. In one embodiment, if a user desires to know whether a product has a fat content less than 6% and the product label gives fat content in grams, the application (220) will determine the equivalent percentage of the fat content, make the comparison, and return the result to the consumer. If the nutritional information provides detailed values for only one serving but the product as a whole contains 2.5 servings, a calculation may be performed to provide the consumer with the nutritional information for the entire product. These features are beneficial for consumers who want to be conscientious about the food products they buy but do not want to perform tedious calculations on serving size, calories per serving size, fat content, etc. Additionally, taxonomic structures can be used to exchange scientific names of ingredients for their common names. For example, the ingredient "sodium chloride" could be communicated in its generic form "salt." If the information on the product label is written in a different language, the language can be converted to a language of the consumer's choice. Changes to the text can also include alterations of format and font of the data. Thus, the user can more efficiently understand the text and not overlook information on the product label.

Consumers may also personalize the information that they receive from the database by setting filters for allergies, likes and dislikes regarding an ingredient, dietary restrictions/intolerances, religious observance, recommended allowances, prescription drug interferences, or other preferences. The notification of food products which fail to meet the criteria set by the user can be provided on the display of the mobile device, given audibly through a speaker, given visually by flashing a light, or given through other means of communication. For example, food products or ingredients may also be classified into preference groups or classes such as vegan, vegetarian, kosher, or other class. The conscientious consumer can then avoid buying a product that does not conform to his or her dietary preferences or needs due to an inadequate explanation of the product's contents. Analyzing and displaying the food product information may also be life-saving for those with strict dietary needs. In order to find a specific ingredient, such as peanuts, soy, egg, etc., attributes containing ingredients can be parsed to find the specific ingredient. The consumer is then notified if the specific ingredient is located.

Figure 6:
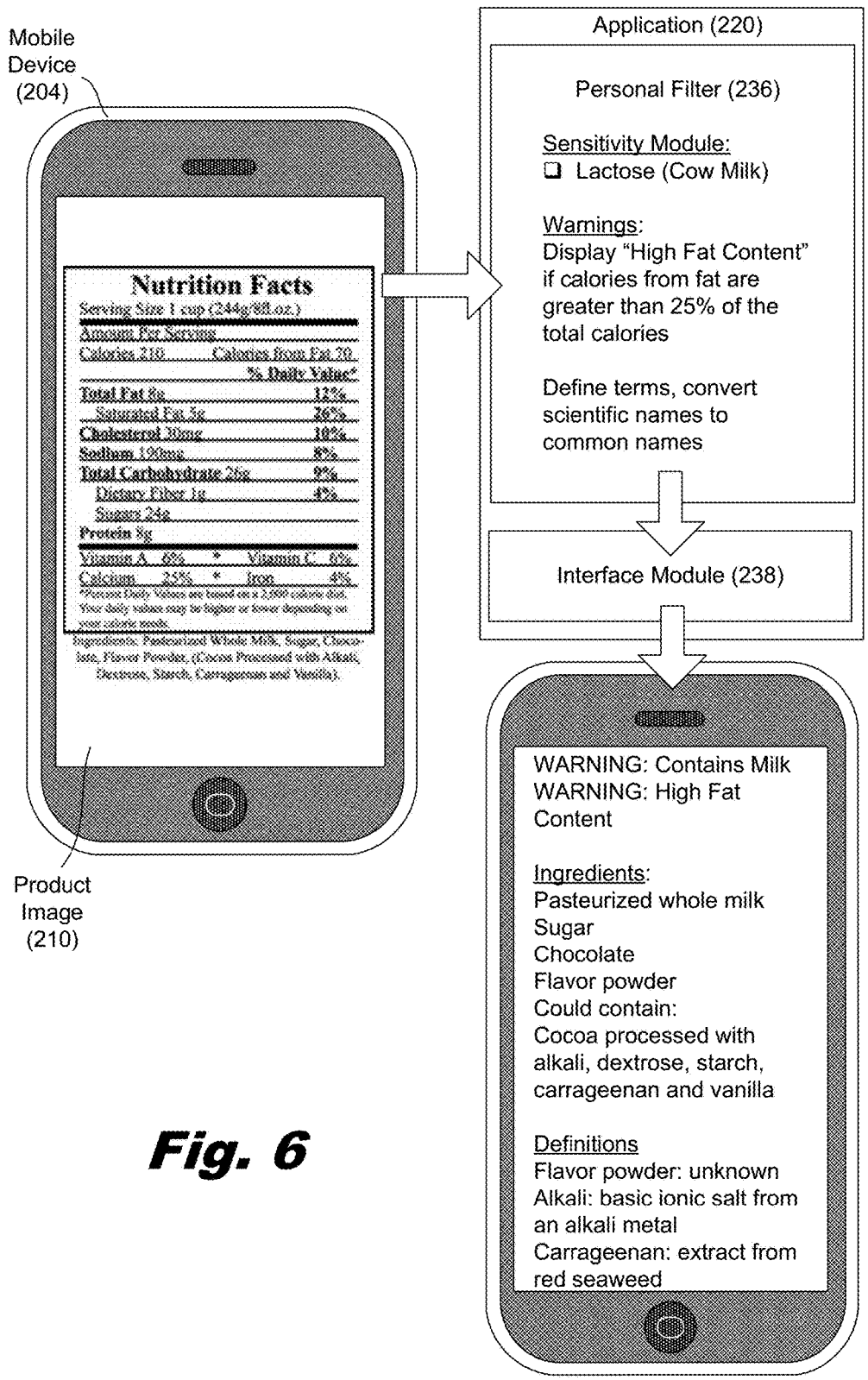
FIGS. 6-9 are illustrative examples of template based recognition of food product information which provides personalized output to a user, according to one embodiment of principles described herein.

In the scenario shown in FIG. 6, a user has taken a product image (210) from a chocolate milk carton using her mobile device (204). The application resident on the mobile device (204) follows the steps described above to produce a verified data table which contains the information in the product image (210). The personal filter module (236) then applies user specific criteria to the data contained in the data table (234, FIG. 5). In this example, the user (or a person the user purchases products for) has a sensitivity to lactose. Consequently, the personal filter module (236) has been configured to detect products which contain cow milk or milk products and display a warning for these products. Additionally, the user is concerned with products that have a high percentage of fat. Consequently, the personal filter module (236) has been configured to detect products in which fat contributes more than 25% of the total calories. The user has also requested that the personal filter define terms used in the ingredients and to convert scientific names to common names. The personal filter (236) uses the data table to make these evaluations and passes the filtered output to the interface module (238). As discussed above, the interface module presents the filtered output to the user. The interface module (238) may use a variety of methods to communicate with the user, including audio and visual communications. In some embodiments, the interface module (238) may be interactive and provide the user with options to display more detailed data, adjust settings, scan another item, or other options.

In this example, the interface module (238) displays two warnings: a first warning which alerts the user that the product contains milk; and a second warning that the product has a high fat content. The output also includes a listing of the ingredients contained in the product and a list of definitions of less common terms in the ingredient list. For example, the output includes a definition of the ingredient "Carrageenan." If the user wants more information about carrageenan, the user could select the text "Carrageenan." The mobile device could then perform a number of actions to provide additional information about the ingredient. For example, the mobile device could present an online article about carrageenan, perform a web search for carrageenan or access a social network to search for entries related to health aspects of carrageenan.

A number of different data inputs could also be used in conjunction with the application (220). For example, GPS data could be used to identify the location where the image of the product is taken. This could influence the presentation and handling of the data. A mother who images items at a retail location is making purchasing decisions and may need different information than when she is imaging food products at home to generate an inventory of her pantry. These data preferences may be preprogrammed in the personal filter and adjusted by the user.

Figure 7:
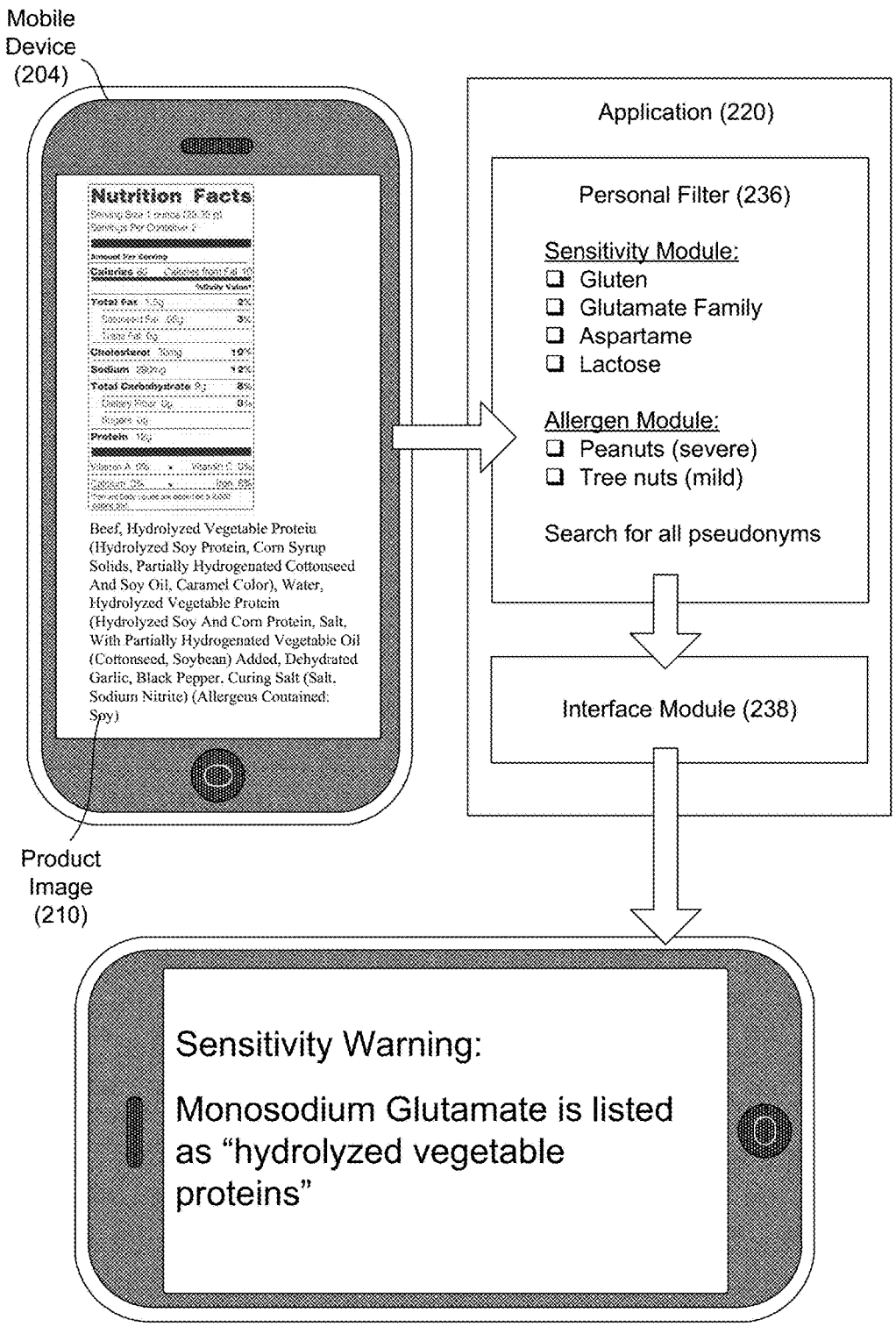

FIG. 7 is another illustrative example of the template-based recognition of food product information and the generation of user specific outputs from the food product information. In the scenario shown in FIG. 7, a user has taken a product image (210) from a package of beef jerky using a mobile device (204). The application (220) resident on the mobile device (204) follows the steps described above to produce a verified data table which contains the information in the product image (210). The personal filter module (236) then applies user specific criteria to the data contained in the data table (234, FIG. 5). In this example, the user has designated sensitivities to gluten, substances in the glutamate family, the artificial sweetener aspartame, and lactose. Additionally, the user has a severe allergy to peanuts and a mild allergy to tree nuts. The user has requested that the personal filter (236) search for all of these substances using any known pseudonym.

The personal filter (238) determines gluten, aspartame, lactose, peanuts and tree nuts are not present in the ingredient list. The personal filter (238) also checks the ingredient list for all known pseudonyms of the designated substances. In some embodiments, the personal filter (236) may also access outside resources to determine if traces of one or more of designated substances may be present in the product but are not included in the ingredient list. In this case, the user's allergy to peanuts is severe, so even trace amounts of peanuts in a product may be hazardous or potentially fatal. The personal filter may use the barcode, product name, or other information to access databases which rate companies and product safety, search food recall databases, access consumer safety databases, or search social networking sites.

The personal filter (236) determines that the only concern is that monosodium glutamate is present in the product and is listed as "hydrolyzed vegetable proteins." This information is presented to the user via the interface module.

Figure 8:
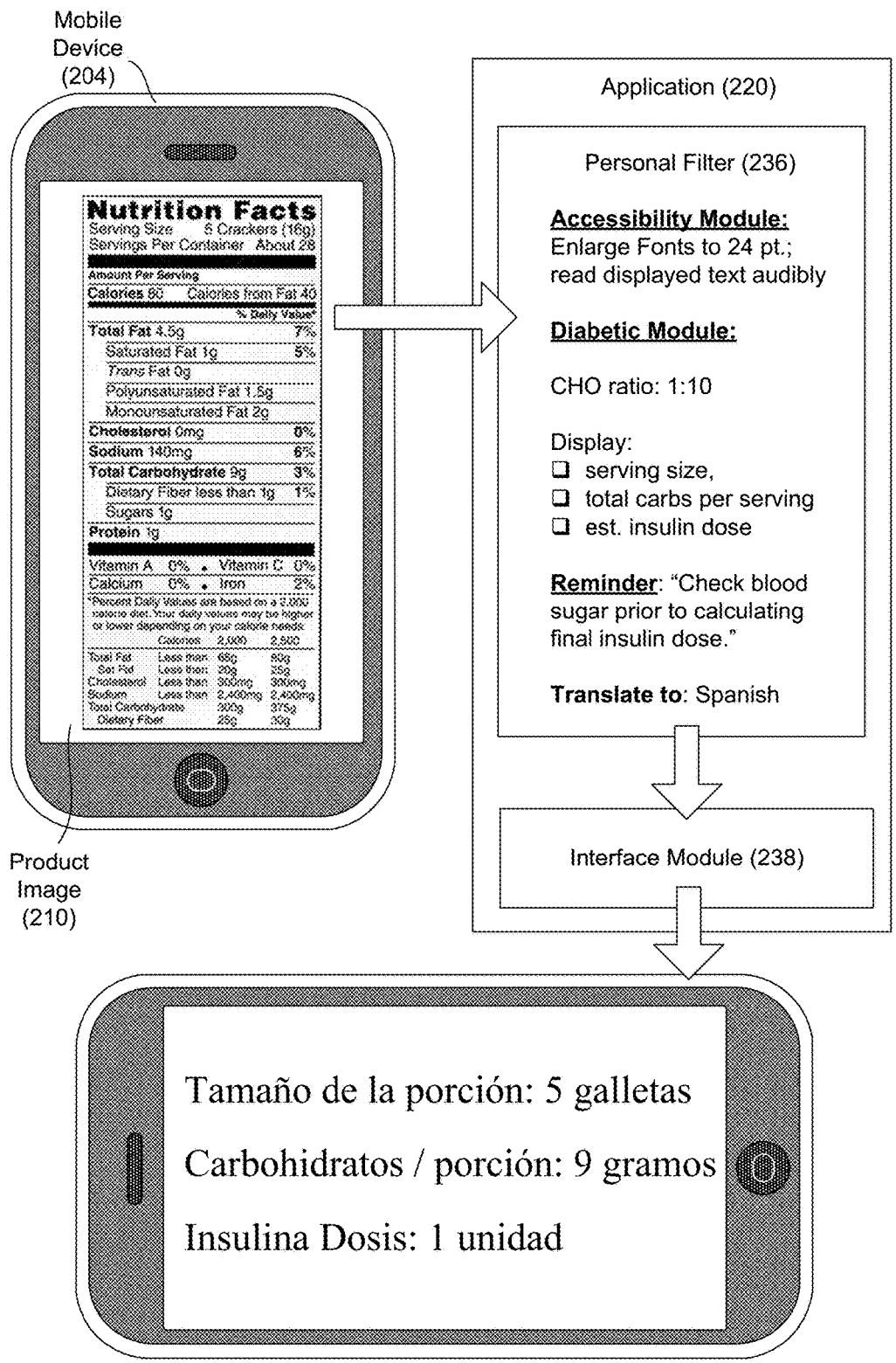

FIG. 8 is another illustrative example of the template-based recognition of food product information and the generation of user specific outputs from the food product information. In the scenario shown in FIG. 8, the user is an aging diabetic which has impaired vision. Although the user purchases products which are labeled in English, the user's native language is Spanish. The user's impaired vision and unfamiliarity with English make it particularly difficult for the user to determine serving sizes and carbohydrate amounts which are required to accurately determine the correct amount of insulin to take with a meal or snack.

The user's personal filter (236) designates that fonts are to be enlarged to 24 point fonts and the displayed text is to be read audibly over the mobile device sound system. A diabetic module designates a CHO ratio of 1:10. This ratio represents the measured effectiveness of insulin in the user's body and is part of a personalized formula used to calculate the amount of insulin for a given amount of carbohydrates consumed by the user. The personal filter (236) displays the serving size, total amount of carbohydrates per serving and estimates an insulin dose for the serving size. The output of the personal filter (236) is translated into Spanish.

In this example, the user has taken a product image (210) from a cracker box using a mobile device (204). The personal filter reads the resulting data table and determines that the serving size is 5 crackers and contains 9 grams of carbohydrates. The personal filter (236) applies an equation and the CHO ratio to the total grams of carbohydrates and provides an estimate of the amount of insulin needed. This information is displayed in enlarged type and in Spanish by the interface module. This information is read audibly to the user in Spanish. The user can then determine how much of the product they will consume. The interface module (238) may display options to increase or decrease the amount of crackers eaten by the user. The personal filter (236) then recalculates the insulin dose.

The personal filter (236) also contains instructions to display a reminder that the user should "Check blood sugar prior to calculating final insulin dose." This reminder will also be displayed to the user in Spanish. According to one illustrative embodiment, the personal filter (236) may also link to external applications. For example, after the user has selected the amount of crackers they have consumed and checked their blood sugar, the personal filter (236) may open an insulin calculator which adjusts the estimated amount of insulin using the blood sugar readings to arrive at a final insulin dose.

Figure 9:
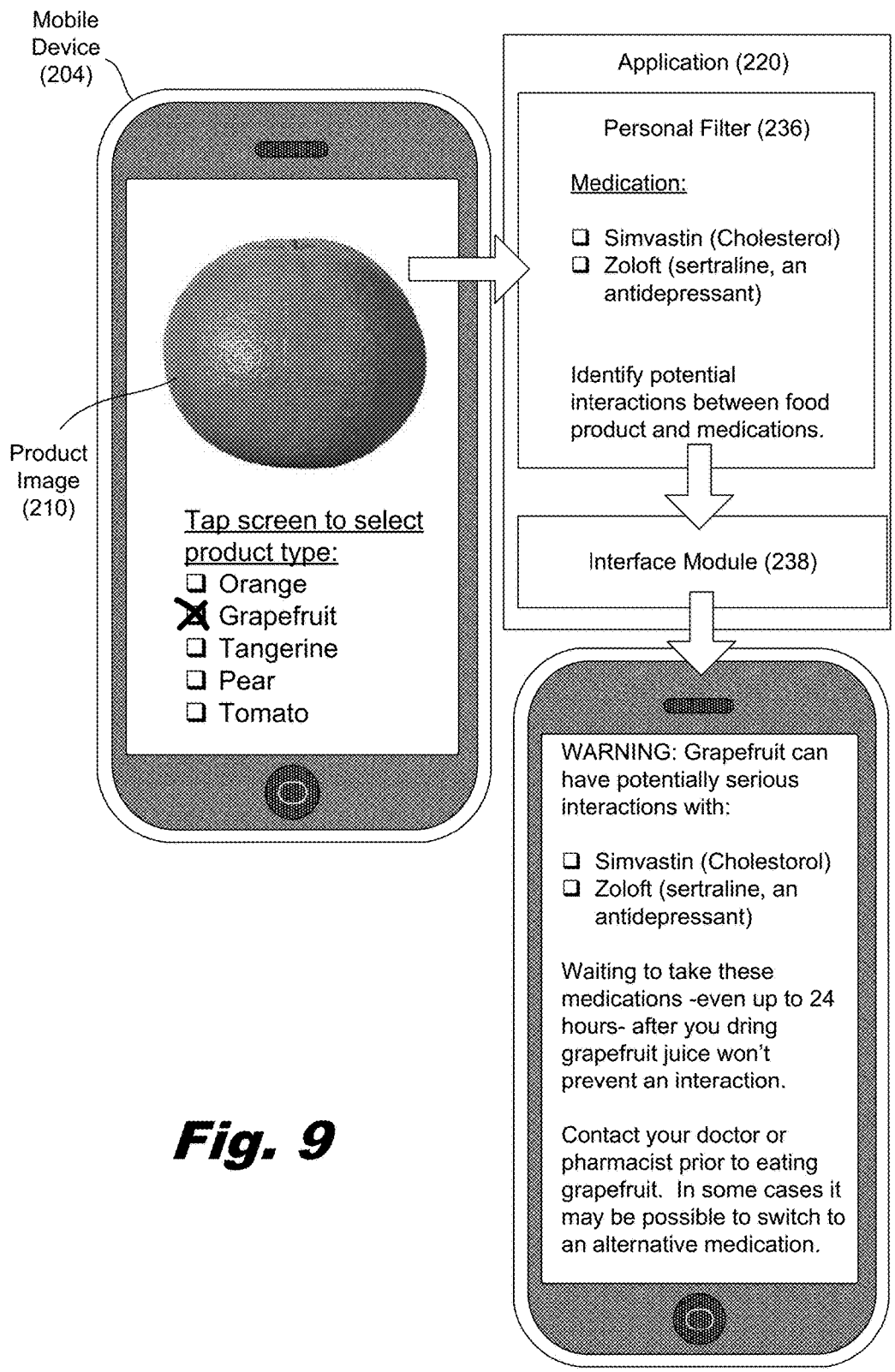

FIG. 9 is an illustrative example of the template-based recognition of a food product image (210). In this case, the user has simply photographed a grapefruit. The image processing module (238) has identified the grapefruit and cropped it from its background. The application (220) has identified the general shape and color of the fruit, but is not able to confirm the actual identify of the fruit. Consequently, the application (220) has prompted the user to provide positive identification by tapping an entry on a list of fruits. The user has correctly selected the "Grapefruit" entry. The nutritional facts associated with a grapefruit may then be displayed.

The user's personal filter (236) includes a listing of medications which the user is currently taking. These medications are "Simvastatin" which is used to control cholesterol and Zoloft® medication which is used to treat depression. The personal filter (236) is instructed to "identify potential interactions between food products and medications." In food/drug interactions, a food product consumed by the user interferes with the proper action of the drug. For example, milk products, fruit juices, alcohol, ant-acids, herbal supplements, caffeine, vitamins, cheese, products containing insoluble fiber, and other products can interfere with one or more types of medication. The food may directly interfere with the drug by neutralizing it or interfere with the absorption of the drug by the body. In other cases, the food may magnify the effect of the drug.

The personal filter determines that grapefruit will interfere with both of the medications the user is currently taking and retrieves a message regarding the interaction. The message may be stored locally on the mobile device or retrieved from a remote server. This message is displayed by the interface module (238).

The examples given above are illustrative and are not intended to be limiting. Personal filters (236) may include additional or different criteria than those illustrated and may be configured in a variety of ways.

Figure 10:
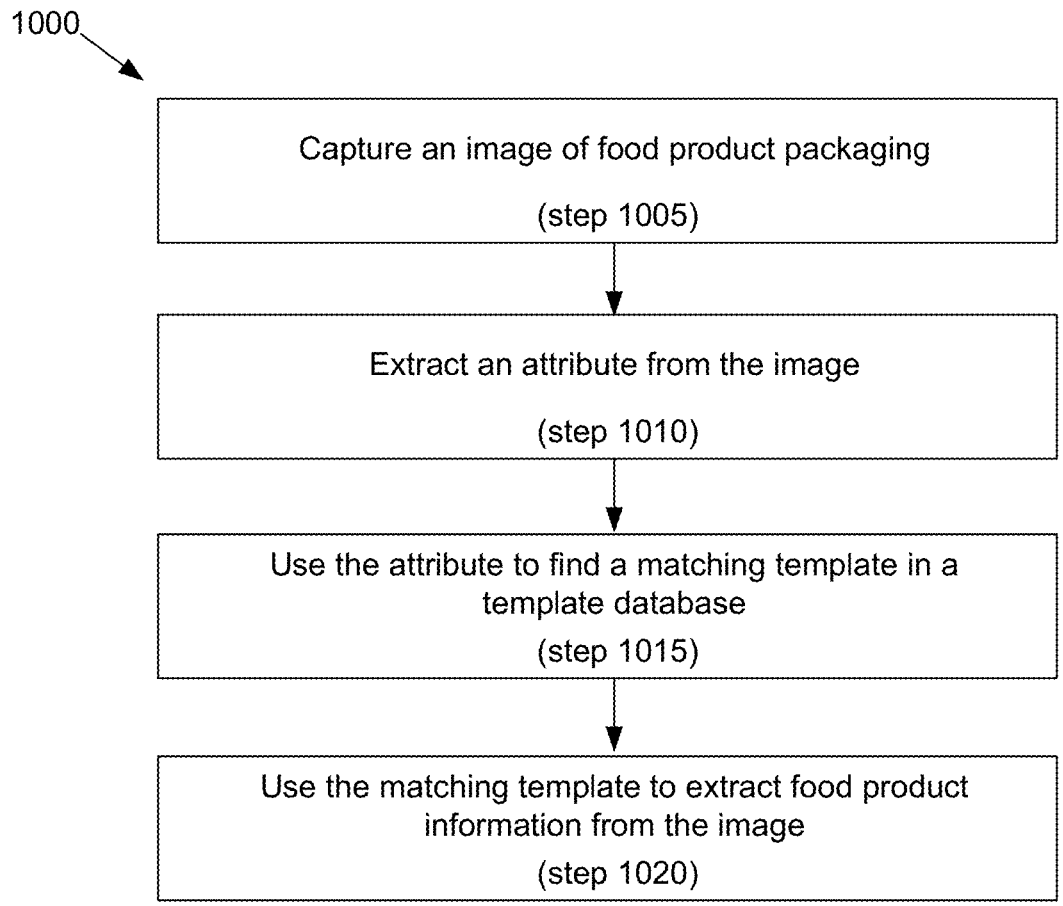
FIG. 10 is a flowchart of an illustrative method for template based recognition of food product information, according to one embodiment of principles described herein.

FIG. 10 is a flow chart of an illustrative method (1000) for template based recognition of food product information. In a first step, an image of food product packaging is captured (step 1005). For example, the image may be taken using a camera on a mobile device. Typically, the image will include ingredient and nutrition information which is printed on the exterior of the product packaging. However, the image may also be on the exterior and/or interior of a natural food item. In some embodiments, the image may be preprocessed to improve the image quality, contrast, or other characteristics.

At least one attribute is extracted from the image (step 1010). For example, the attributes may be text, numbers, graphical elements, sizes, colors, locations, aspect ratios or other features. These attributes may be recognized by an optical character recognition engine or during image pre-processing.

The attribute or attributes are then used to find a matching template in a template database (step 1015). For example, the matching template can be selected by a comparison of graphical elements of the food product packaging with graphical elements of the templates in the template database. Additionally or alternatively, the comparison of alpha numeric text with elements in the templates can also be used to select a matching template.

The matching template is then used to more accurately and quickly extract food product information from the image (step 1020). In some embodiments, the matching template may be used to validate the food product information. For example, the matching template may point out data redundancies or other relationships which can be cross checked to determine if the extracted data is consistent. The extracted data can then be written to a data structure.

In the event that a matching template is not found, a number of approaches could be used. In a first approach, the method proceeds without the benefit of a template and makes a best effort attempt to extract the desired data. A second approach may stop processing the data and inform the user that a template cannot be found. A third approach may be to initiate a process for updating the template database with a new template. As discussed above, these new templates can be created in a variety of ways, including using crowd sourced data, entry of data by the user, a template crawler, accessing manufacturer databases, or other methods. Additionally, a new template could be created from the extracted data generated by the application (220, FIG. 2). In some cases, the new template may be verified prior to inclusion in the template database. For example, crowd sourcing may be used to verify the new template.

The extracted data is then transformed according to user defined preferences. As discussed above, these user defined preferences may include analyzing the data for user allergens, language translation, nutrient content filter, definition of uncommon terms, calculating user specific values, recording a scanning history of the user, recording a history of user consumption, searching for product recall notices, searching for product reviews, presenting reminders to the user, setting accessibility options, and other preferences. For example, the food product information may be analyzed for potential drug interactions with medications taken by the user. These potential drug interactions are displayed to the user. Additionally, the application may track a history of food product information consumed or purchased by the user. This information may be used to measure progress toward a health goal or a desired diet modification. For example, the user may desire to avoid foods which have a high fat content. The user preferences may be adjusted to alert the user of foods which have a fat content above a given threshold and to track the foods which are purchased or consumed by the user. These results are graphically displayed to the user to track the user's progress.

This method for template based recognition of food product information can also be applied to natural food items. As discussed above, a picture of the natural food item can be taken and then used to identify potential natural food items which may match the natural food item in the picture. For example, options may be presented to the user to confirm which of the potential natural food items correctly matches the natural food item. After a correct identification of the natural food item is made, a template with the nutritional content and other data associated with the natural food item can be retrieved from a database.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for template based recognition of food product information comprises, with a processor:
    extracting an attribute from an image of food product packaging;
    finding, in a template database, a template matching the attribute;
    extracting, by referencing the matching template, food product information from the image;
    transforming the food product information according to user defined preferences;
    tracking a history of food product information imaged by the user to measure progress toward a health goal; and
    displaying the transformed information and the history of food product information to a user.

2. The method of claim 1, in which the matching template identifies data redundancies in the image, and the method further comprises using the data redundancies to cross check the extracted food product information.

3. The method of claim 1, further comprising capturing the image by taking a picture of the food product packaging using a mobile device.

4. The method of claim 3, further comprising recording Global Positioning System (GPS) data that identifies a location where the image of the food product packaging was taken.

5. The method of claim 1, in which extracting an attribute from the image comprises optical character recognition and feature recognition of graphical elements of a nutrition fact table on the food product packaging.

6. The method of claim 1, in which finding a template matching the attribute comprises a comparison of graphical elements of the food product packaging with graphical elements of templates in the template database and a comparison of optically recognized alpha numeric text with elements of the templates in the template database.

7. The method of claim 1, further comprising using the matching template to validate food product information by comparing optically recognized text strings and values with expected text strings and value ranges contained within the matching template.

8. The method of claim 7, further comprising writing validated food product information to a data structure.

9. The method of claim 1, in which the user defined preferences comprise at least one of: analyzing the data for user allergens, a nutrient content filter, defining uncommon terms, calculating user specific values, recording a scanning history of the user, recording a history of user consumption, searching for product recall notices, searching for product reviews, presenting reminders to the user, and setting accessibility options.

10. The method of claim 1, in which the food product information comprises ingredient and nutritional information translated into a language specified in the user defined preferences.

11. The method of claim 1, further comprising, on determining that a matching template is not found, displaying a warning to the user.

12. The method of claim 1, further comprising, in response to not finding a matching template, adding new templates to the template database.

13. The method of claim 1, further comprising updating the template database by creating new templates from crowd sourced data collected in response to determining that a predetermined number of users have not been able to find a template in the template database matching a given product label.

14. The method of claim 1, further comprising recognizing errors in templates using crowd sourcing.

15. The method of claim 1, further comprising:
    analyzing the food product information for potential drug interactions with medications taken by the user; and
    displaying the potential drug interactions to the user.

16. A system comprising:
    a template database comprising templates of food product packaging;
    a processor with memory to store instructions, the instructions executable by the processor to implement:
        a template matching module to match an image of a food product with a template in the template database;
        an analytics engine to extract information from the image according to the template; and
        a personal filter to manipulate the extracted information according to user preferences to produce personalized data, wherein the user defined preferences comprise at least one of: analyzing the data for user allergens, applying a nutrient content filter, calculating user-specific nutrient values, recording a history of user food consumption, searching for product recall notices, searching for product reviews, and presenting dietary reminders to the user;
    in which the personalized data is presented to a user on an electronic display device.

17. The system of claim 16, the personal filter to further:
    track a history of food product information imaged by the user to measure progress toward a health goal; and
    display the history to the user.

18. The system of claim 16, wherein the analytics engine identifies data redundancies in the image and uses the data redundancies to cross check the extracted food product information.

19. A computer program product for template based recognition of food product information, the computer program product comprising:
- a non-transitory computer readable storage device having computer readable program code embodied therewith, the computer readable program code comprising:
- computer readable program code configured to extract at least one attribute from an image of food product packaging;
- the computer readable program code configured to use the at least one attribute to identify a matching template in a template database;
- the computer readable program code configured to use the matching template to extract food product information from the image;
- the computer readable program code configured to transform the food product information according to user preferences and present the food product information to the user in a transformed condition; and
- update the template database by creating new templates from crowd-sourced data collected in response to determining that a predetermined number of users have not been able to find a template in the template database matching a given product label from food packaging.

20. The computer program product of claim 19 further comprising computer readable program code configured to adjust the user defined preferences according to a location where the image of the food product packaging was taken.

* * * * *